United States Patent [19]

Sweere et al.

[11] Patent Number: 5,738,316

[45] Date of Patent: Apr. 14, 1998

[54] VERTICAL WORK CENTER

[75] Inventors: Harry C. Sweere, Minneapolis; Donald M. Voeller, Eagan, both of Minn.

[73] Assignee: Ergotron, Inc., St. Paul, Minn.

[21] Appl. No.: 415,660

[22] Filed: Apr. 3, 1995

[51] Int. Cl.$^6$ ............................................. F16L 3/00
[52] U.S. Cl. ............................. 248/123.11; 248/325.1; 248/920; 248/423
[58] Field of Search ........................... 248/123.11, 124.1, 248/125.1, 278.1, 281.11, 324, 325.1, 917, 920, 923, 922

[56] References Cited

U.S. PATENT DOCUMENTS

| | | | |
|---|---|---|---|
| 3,565,372 | 2/1971 | Jones et al. | 248/278.1 X |
| 4,166,602 | 9/1979 | Nilsen et al. | 248/324 X |
| 4,567,835 | 2/1986 | Reese et al. | 248/920 X |
| 4,691,886 | 9/1987 | Wendling et al. | 248/920 X |
| 4,706,919 | 11/1987 | Soberalski et al. | 248/918 X |
| 5,213,293 | 5/1993 | Muentener et al. | 248/123.11 |

*Primary Examiner*—Ramon O. Ramirez
*Attorney, Agent, or Firm*—Hugh D. Jaeger

[57] ABSTRACT

Vertical work center for positioning a computer monitor vertically and horizontally about a floor or ceiling mounted column. A positionable arm is pivotally secured to the upper portion of the mounting column in the case of a floor mounted column or to the lower portion of the mounting column in the case of a ceiling mounted column. The outward end of the positionable arm includes a tilt/swivel mount which supports a monitor caddy.

30 Claims, 11 Drawing Sheets

5,738,316

VERTICAL WORK CENTER

BACKGROUND OF THE INVENTION

I. Field of the Invention

The present invention is for a computer work center, and more particularly pertains to a column mounted counterbalanced positionable arm for positioning a computer monitor.

II. Description of the Prior Art

Prior art devices for positioning of computers and like components, while having some counterbalancing in the form of coil springs, offered uneven and sometimes jerky adjustment tendencies. Accurate positioning was a tedious affair in that several tries to position the monitor at a desired position were necessary. Coil springs did not offer a constant and linear tensioning to obtain good positioning on the initial try.

Prior art counterbalance systems which feature gas spring technology typically support the computer from the bottom. The present invention offers top suspension, thereby leaving a clear area beneath the CRT to allow for movement of personnel or equipment beneath the CRT.

The present invention offers a counterbalanced support system offering superior dynamic stability for initial positioning and support of a monitor in a caddy.

SUMMARY OF THE INVENTION.

The general purpose of the present invention is to provide a computer work center having a counterbalanced positionable column mounted arm for positioning of a computer monitor while being suspended from above.

According to one embodiment of the present invention, there is provided a floor mounted column having a positionable arm and caddy for positioning a computer monitor, a folding work table, and a computer mounting platform.

One significant aspect and feature of the present invention is a vertical work center having a stable and adjustable counterbalanced support arm for a caddy and a contained monitor.

Another significant aspect and feature of the present invention is a counterbalanced support arm having a tilt/swivel mechanism.

A further significant aspect and feature of the present invention is the use of gas springs in a counterbalanced support arm which suspends the CRT from above.

An additional significant aspect and feature of the present invention is an adjustable counterbalance control for various size monitors.

Still another significant aspect and feature of the present invention is a counterbalanced support arm having a locking member.

Yet another significant aspect and feature of the present invention is a vertical work center having a fold down work shelf.

Another significant aspect and feature of the present invention is a computer mounting platform.

Another significant aspect and feature of the present invention is a vertical work center which can be ceiling mounted.

Another significant aspect and feature of the present invention is the ability of the present invention to balance a broad weight range of CRT monitors and keyboards and the like from 30–100 pounds.

Another significant aspect and feature of the present invention is a vertical work center having a counterbalance support arm having identical counterbalance and movement force over its entire range of adjustment and over its entire weight handling range.

Another significant aspect and feature of the present invention is the inherent "use position" stability via the hydro-lift feature of the gas springs while still allowing operation adjustment with no supplementary controls.

Another significant aspect and feature of the present invention is a tilt-swivel mount which allows one-handed instantaneous repositioning of a CRT monitor, yet still has an inherent anti-rotational friction to allow stability during use.

Having thus set forth significant aspect and features of the present invention, it is the principal object hereof to provide a vertical work center for the stable support of a computer, a monitor, and associated equipment.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
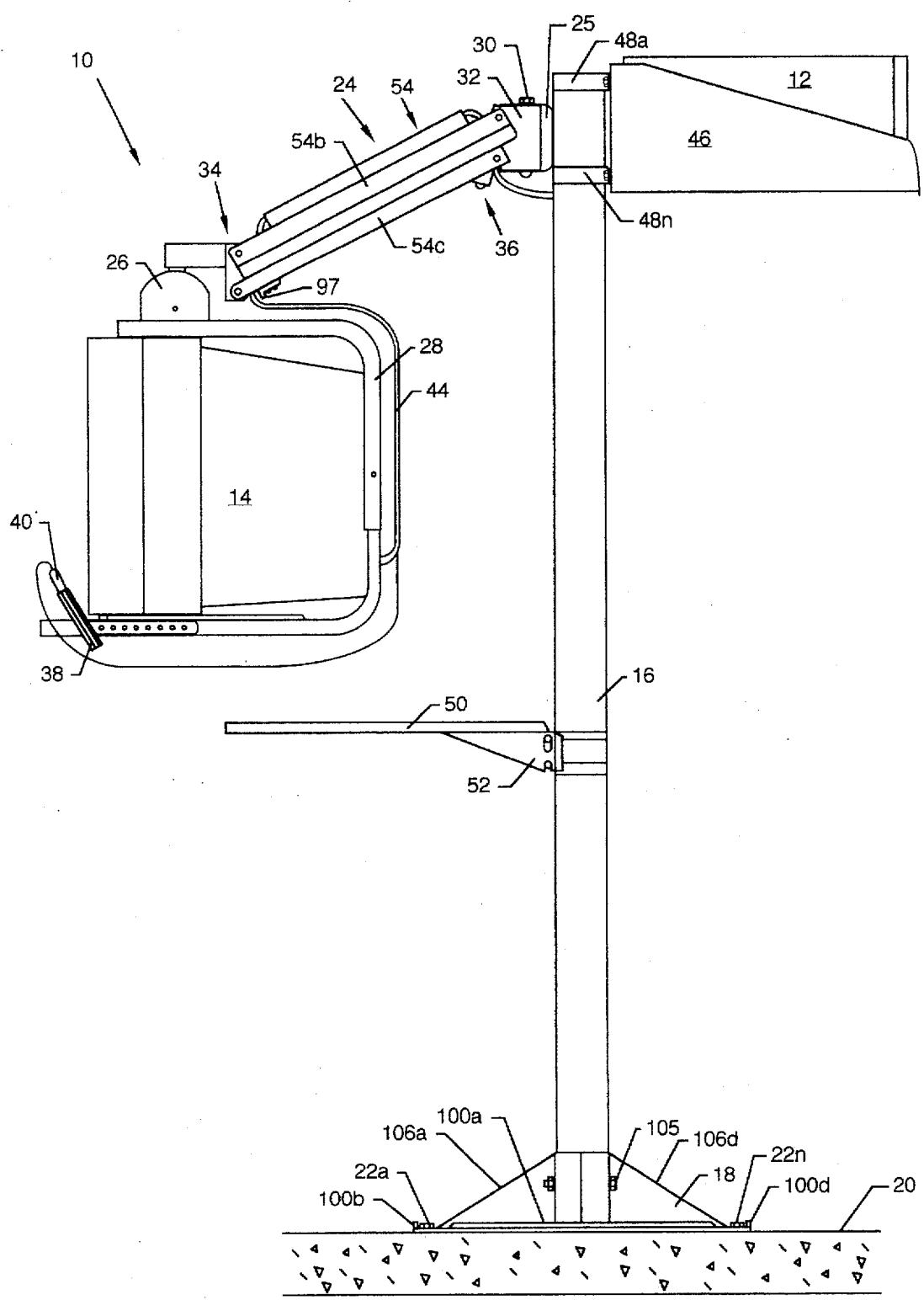
FIG. 1 illustrates a side view of a vertical work center, the present invention.

FIG. 1 illustrates a side view of a vertical work center 10 which provides support for a computer 12, a monitor 14, and other computer associated peripheral devices.

A vertically oriented box tube column 16 is aligned and secured in a base 18 which is secured to a floor 20 by a plurality of fasteners 22a–22n such as screws, bolts, anchors and the like. A positionable arm 24 is pivotally secured at one end to a bracket 25 at the upper region of the column 16 and at the other end to a tilt/swivel mount 26. The tilt/swivel mount 26 supports a caddy 28 in which the monitor 14 is housed. A pivot 30, such as a nut and bolt assembly, aligns through the bracket 25 and through an upper arm assembly 32 to pivotally secure the positionable arm 24 to the column 16. A lower arm assembly 34 provides support for the tilt/swivel mount 26. An arm counterbalance adjuster control 36 housed in the upper arm assembly 32 provides for counterbalance tensioning according to the weight carried in the caddy 28 in the form of a monitor 14, a pen holder 38 and light pen 40, or optional keyboard tray and keyboard which can alternatively attach and secure to the bottom of the caddy 28. Power and other computer cables 44 are routed from the box tube column 16 and computer 12 along the exterior of the positionable arm 24 and along the caddy 28 to the rear of the monitor 14 and/or to the light pen 40. An adjustable slide plate 97 forcibly locks the positionable arm 24 in the fully descended position to allow easy and safe removal of the CRT 14. A support shelf 46 is secured to the column 16 by a plurality of brackets 48a–48n. The support shelf 46 accommodates the computer 12 or any desired peripheral device. An optional fold-down work shelf 50 is secured to the column 16 via a fold-down bracket 52 secured to the column 16.

Figure 2:
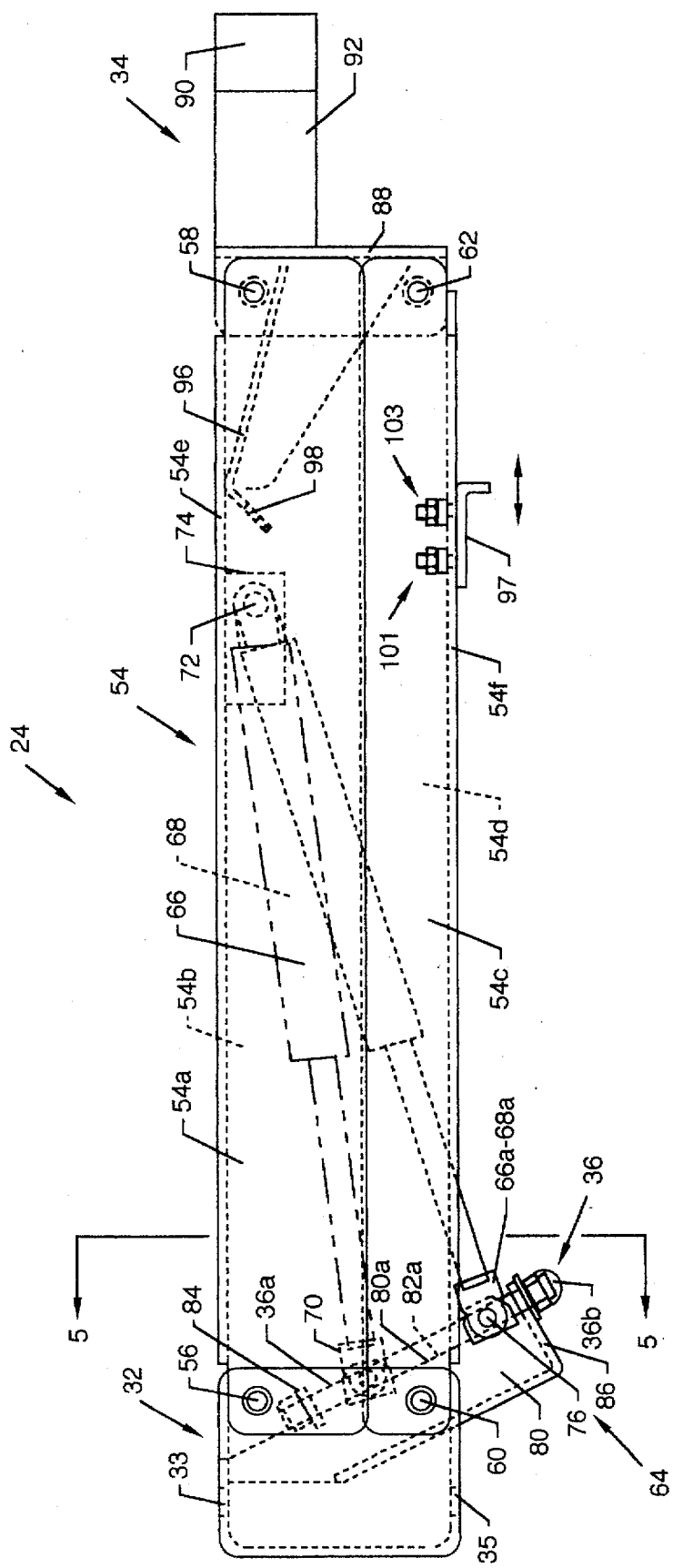
FIG. 2 illustrates a side view of a positionable arm.
Figure 3:
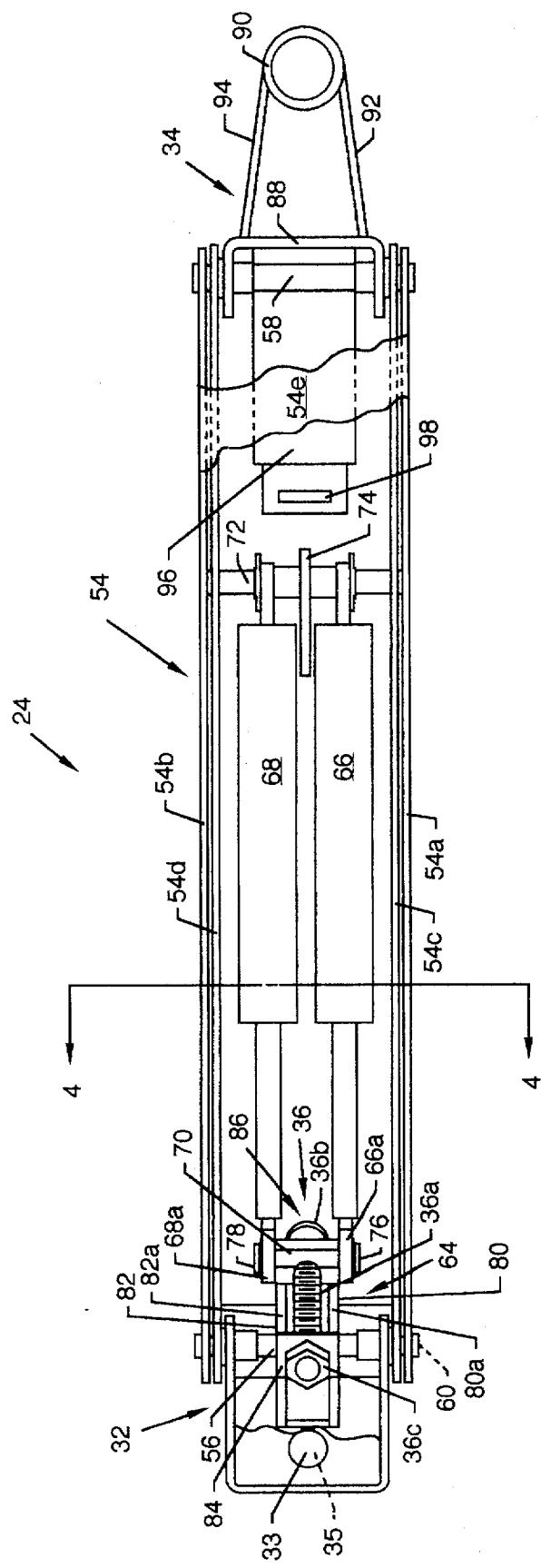
FIG. 3 illustrates a cutaway top view of a positionable arm.
Figure 4:
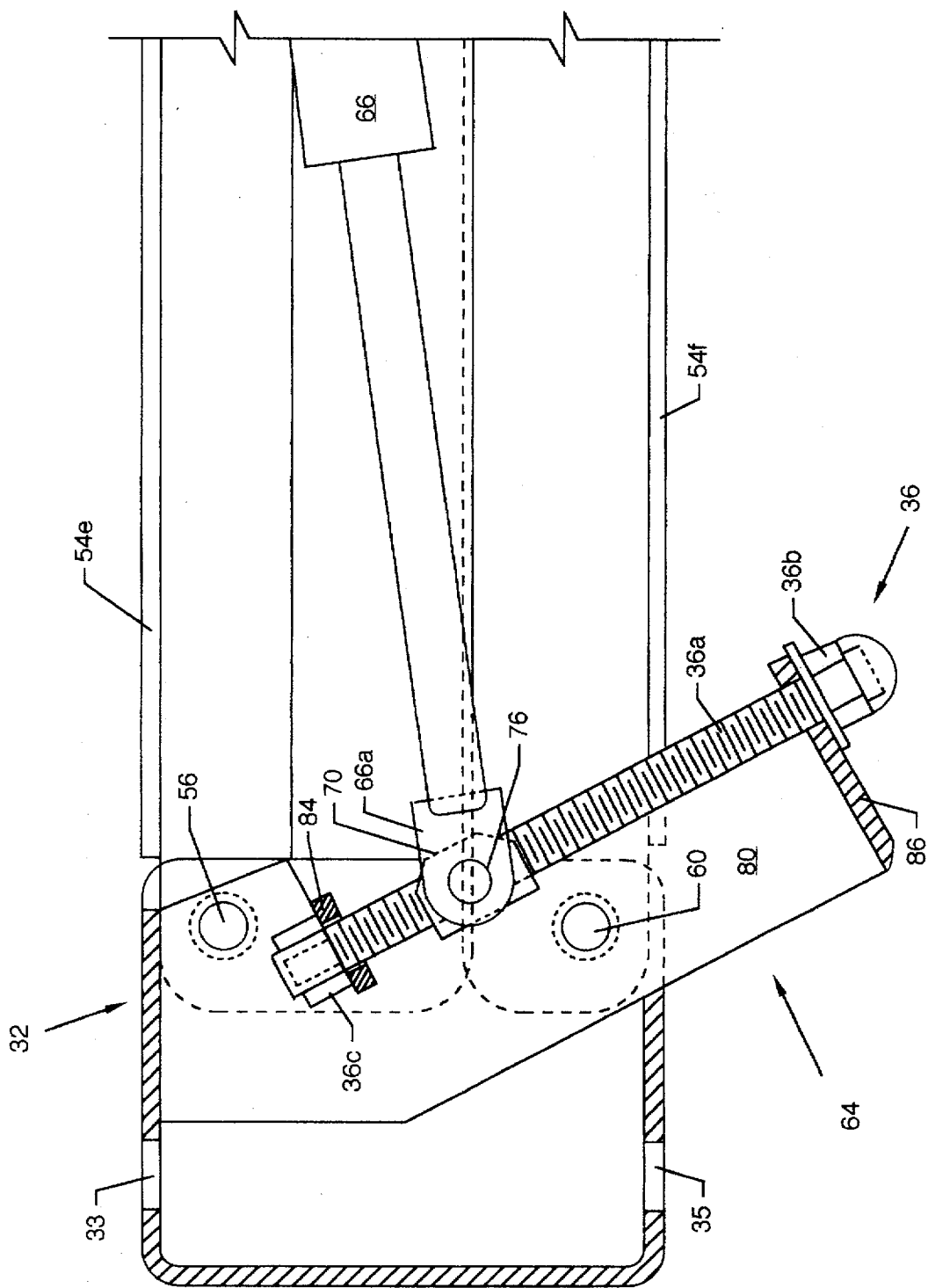
FIG. 4 illustrates a cross sectional view of the upper arm assembly taken along line 4—4 of FIG. 3.
Figure 5:
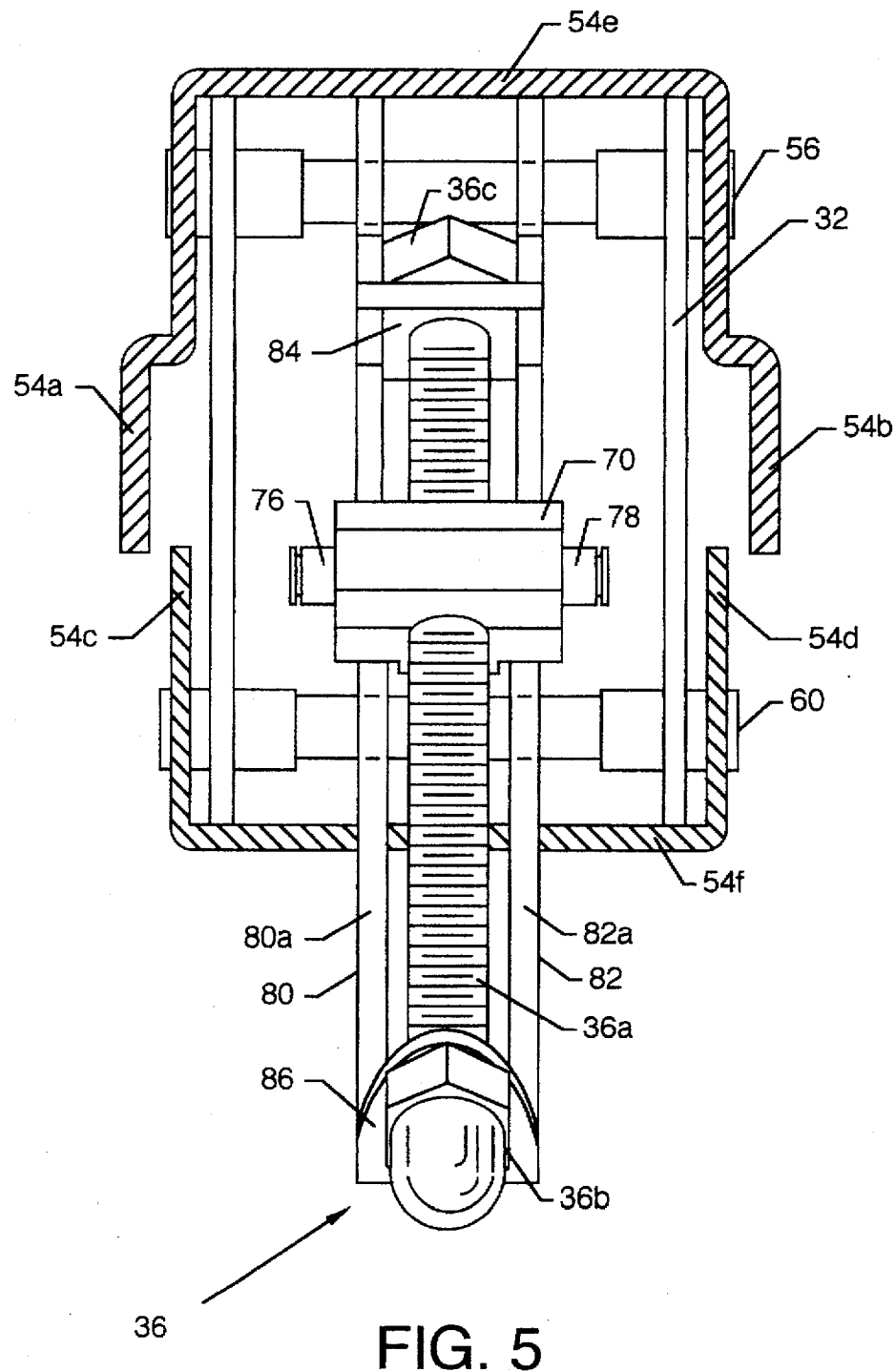
FIG. 5 illustrates a cross sectional view of the upper arm assembly and a full view of the sliding anchor assembly taken generally along line 5—5 of FIG. 2.
Figure 6:
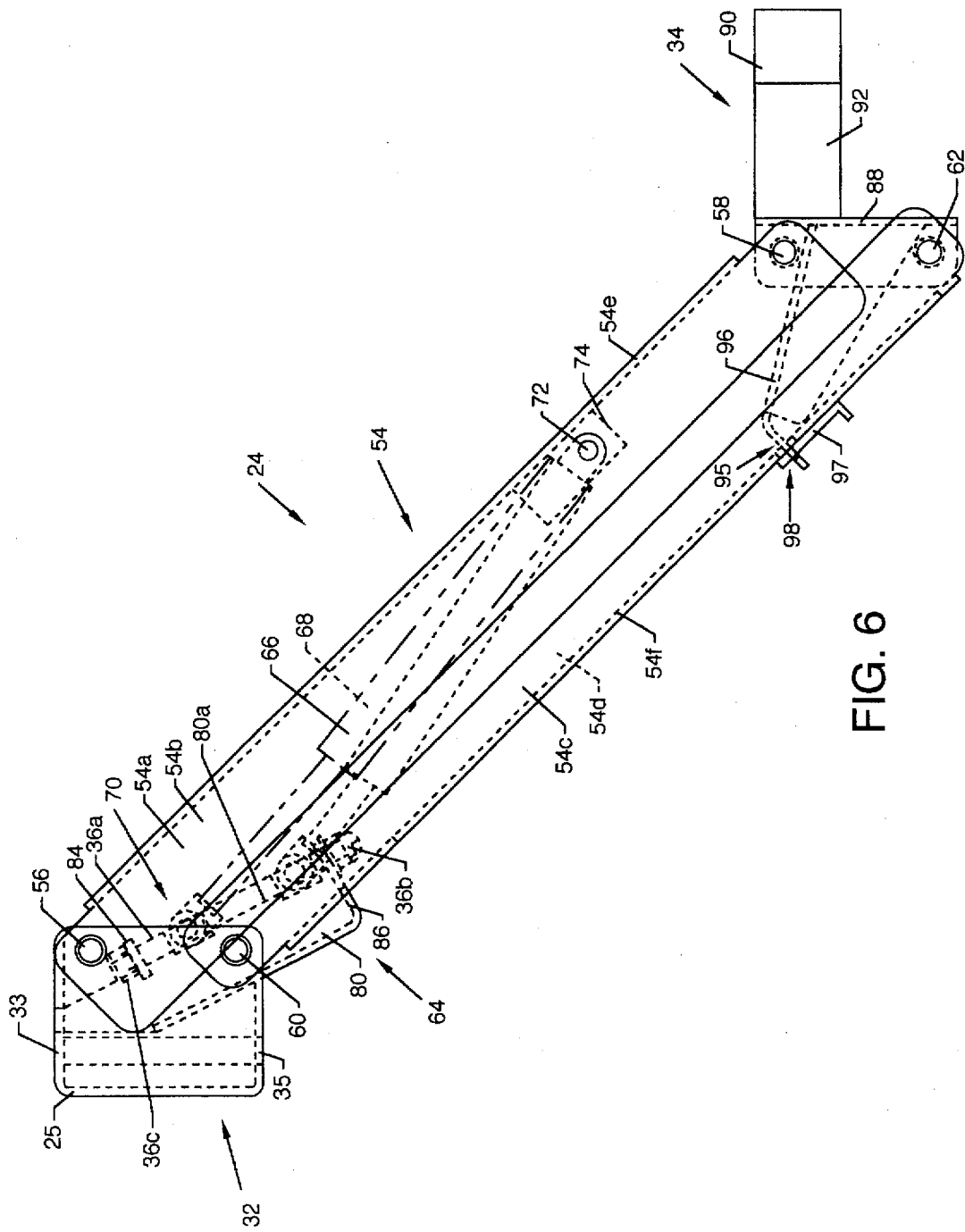
FIG. 6 illustrates a side view of the positionable arm in the full down and locked position.

FIGS. 2 and 3 illustrate a side view and a cutaway top view, respectively, of the positionable arm 24 where all numerals correspond to those elements previously described. A four bar linkage assembly 54 includes opposing upper linkage bars 54a and 54b in the form of a configured channel and includes a top integral member 54e. The upper linkage bars 54a and 54b are pivotally secured to the upper or inner arm assembly 32 by pin 56 and to the lower or outer arm assembly 34 by pin 58. Opposing lower linkage bars 54c and 54d in the form of a channel, and having a bottom integral member 54f, are pivotally secured to the upper arm assembly 32 by pin 60 and to the lower arm assembly 34 by pin 62. The upper arm assembly 32 is in the form of a box having a full open inner side and a partial bottom side through both of which a sliding anchor assembly 64 is aligned and secured. Upper and lower holes 33 and 35 provide for securement of the box-like upper arm assembly 32 to the bracket 25 of FIG. 1 by the pivot 30. The ends of one or more gas springs 66 and 68, each having hydrolift capabilities, are secured between an adjustable slide member 70 included in the sliding anchor assembly 64 in the upper arm assembly 32 and a pin 72 aligned between the upper linkage bars 54a and 54b and intementing bracket 74 secured to the top integral member 54e. Multiple positions for the gas springs 66 and 68 are shown in dashed lines. The adjustable slide member 70 includes pivot pin mounts 76 and 78 upon which the moveable ends 66a and 68a of the gas springs 66 and 68 are rotatably secured. The adjustable slide member 70 is slidably adjusted along surfaces 80a and 82a of configured vertically aligned and opposed vertical members 80 and 82 each of which is an integral member of the sliding anchor assembly 64. Another member of the sliding anchor assembly 64 is the arm counterbalance adjuster control 36 consisting of a nut and threaded bolt assembly secured between upper and lower planar ends 84 and 86 which are secured between the opposing vertical members 80 and 82. The arm counterbalance adjuster control 36 including a threaded bolt 36a, and a fixed head 36b and a fixed nut 36c each fixed to the threaded bolt 36a, aligns between the ends 84 and 86 and the opposing vertical members 80 and 82 and turns as a unit to position the adjustable slider member 70 along the surfaces 80a and 82a of the opposing vertical members 80 and 82. The threads of the threaded bolt 36a engage internal threads in the adjustable slide member 70 for purpose of adjustment. The sliding anchor assembly 64 is also illustrated in FIGS. 4 and 5. The lower arm assembly 34 is constructed of a vertically oriented channel 88, a cylindrical bracket 90 and vertically oriented planar members 92 and 94 therebetween. The lower arm assembly 34 is pivotally secured to the four bar linkage assembly 54 by pins 58 and 62 extending through the upper and lower linkage bars 54a–54b and 54c–54d, respectively. An angled stop bar 96 is secured, such as by welding, to the inner portion of .the channel 88. The stop bar 96 limits the upward and downward travel of the positionable arm 24 by contacting the top integral member 54e or the bottom integral member 54f of the four bar linkage 54, as illustrated in FIG. 6. Use of the stop bar 96 precludes full extension or compression of the gas springs 66 and 68 to prevent undue stress and wear on the internal portions of the gas springs 66 and 68 as well as to allow full utilization of the hydrolift capabilities of the gas springs 66 and 68. A slot 98 located in the end of the stop bar 96 allows for pinning the positionable arm 24 in the full downward position as illustrated in FIG. 6 so that payload in the form of a monitor or other equipment may be loaded or unloaded from the caddy 28 without having to be concerned about uncontrolled movement of the positionable arm 24 with respect to the gas springs 66 and 68 when weight is added or removed. An adjustable slide plate 97 having securing nut, wave washer, and stud assemblies 101 and 103 is mounted on the lower integral member 54f to accommodate the slot 98 of the stop bar 96 to pin the positionable arm 24 in the downward position as illustrated in FIG. 6.

FIGS. 4 and 5 illustrate cross sectional views along line 4—4 of FIG. 3 and line 5—5 of FIG. 2, respectively, where all numerals correspond to those elements previously described. FIG. 4 shows the side cross sectional view of the upper arm assembly 32 including the sliding anchor assembly 64, and FIG. 5 shows a cross sectional view of the upper arm assembly 32 and a full view of the sliding anchor assembly 64 from the inside of the four bar linkage assembly 54. Configured planar opposing members 80 and 82 align and secure vertically in the upper arm assembly 32 and include surfaces 80a and 82a upon which the adjustable slide member 70 is adjusted. The angle of inclined surfaces 80a and 82a is determined by a mathematical algorithm which provides for a linear positioning force over the entire vertical adjustment range of the arm and over a load weight counterbalance range of 30–100 pounds. Threaded bolt 36a is adjusted by rotating the fixed head 36b to operate the slide member 70 along the surfaces 80a and 82a in screw-jack fashion. This adjustment positions the moveable ends 66a and 68a of the gas springs 66 and 68 to appropriately tension the four bar linkage assembly 54 with respect to the payload secured at the lower (or outer) arm assembly 34. Alternate positions of adjustment of the ends of the gas springs 66 and 68 are illustrated in dashed lines in FIG. 2 and FIG. 6. It is noted that the sides of the upper linkage bar portions 54a and 54b are angled to accommodate the lower linkage bars 54c and 54d. The angle of surfaces 80a and 82a is designed to provide linear control of the payload suspended by the arm throughout. Full upper and lower arm adjustment within the full range of load capacity adjustment is offered by slide member 70.

MODE OF OPERATION

FIG. 6 illustrates the positionable arm 24 in the full down position whereby the stop bar 96 has passed through a slot 95 in the bottom of integral member 54f and has been engaged by the adjustable slide plate 97, and is shown pinned such as for loading or unloading of a monitor into the caddy 28 of FIG. 1. The adjustable slide plate lever 97 slidably engages in the slot 98 in the end of the stop bar 96 for locking purposes. Incorporation of the stop 96 ensures that the gas springs 66 and 68 have not reached their full travel and ensures that the hydrolift capabilities can still be fully utilized. The hydrolift feature allows stable positioning of the payload at any desired level. Once positioned at the desired height, the payload will stay at the desired height even if the operator bumps, or swivels, the monitor. A nominal force is required to move the monitor from one height to another. The last position of the positionable arm 24 creates a momentary positionable memory for the present position and the positioned arm will tend to remain in that memory position or notch until operator force resets the memory by forcibly repositioning the positionable arm 24. Little or slight force is required to reposition the arm 24, due to the counterbalancing, or to overcome the momentary memory position.

Figure 7:
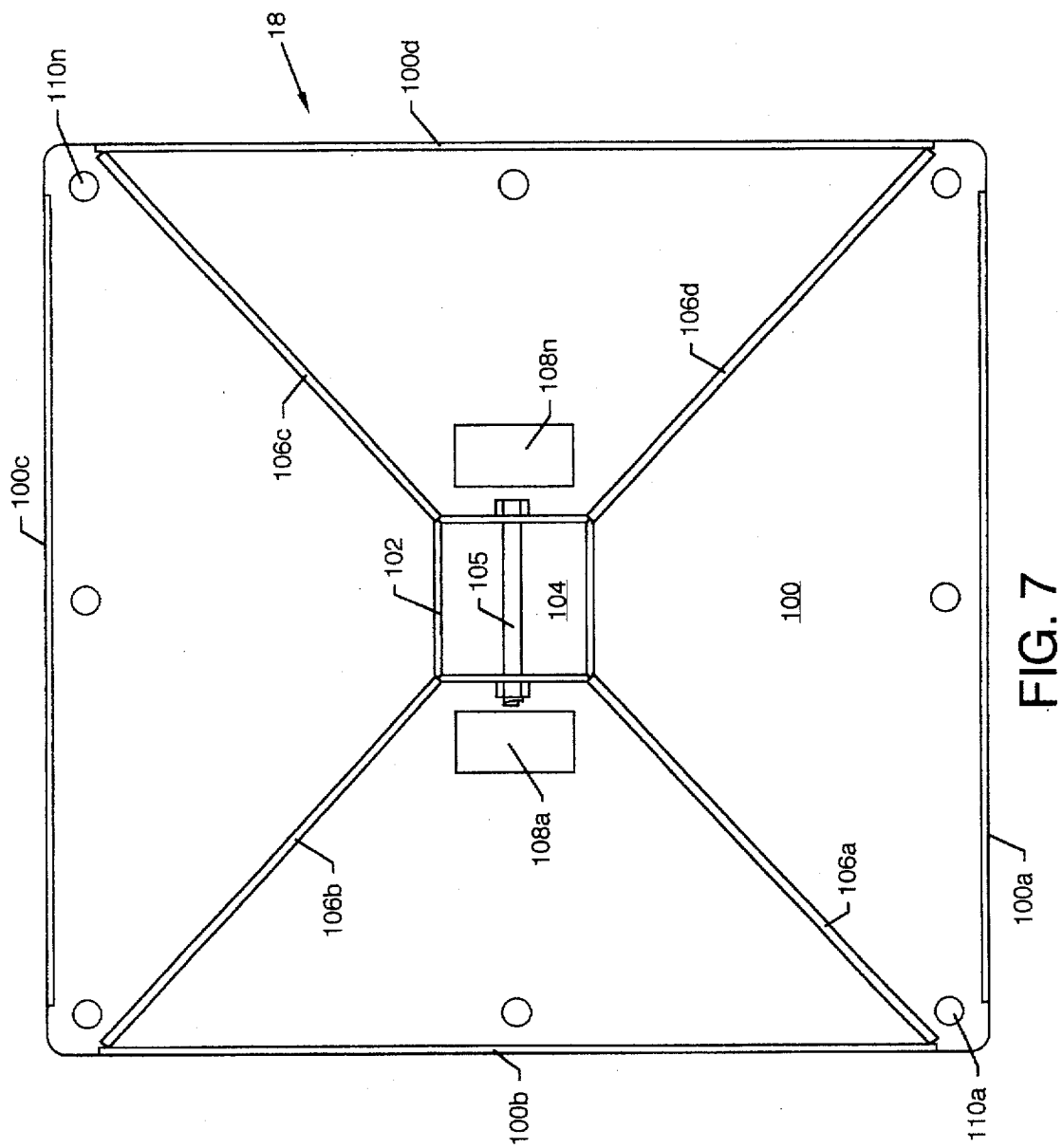
FIG. 7 illustrates a top view of the base.

FIG. 7 illustrates a top view of the base 18 where all numerals correspond to those elements previously described. The base 18 includes a planar member 100 of steel, aluminum, or suitable material bounded by turned up support edge members 100a–100d extending at right angles from the planar member 100. A box tube 102 extends vertically from the planar member 100 to accommodate the box tube column 16 of FIG. 1. Optionally, the member of the planar area 100 intersecting the box tube 102 can be a cutout section 104 to allow the box tube column 16 of FIG. 1 to extend through the planar member if desired. An optional bolt 105 can pass through the box tube 102 and the box tube column 16 to provide for vertical fixation of the box tube column 16 within the box tube 102. Support struts 106a–106d are secured between the planar member 100 and appropriate surfaces of the box tube 102. A plurality of cable passage cutouts 108a–108n are located in the planar member 100 for routing of the line and computer cables 44 from the box tube column 16. Although the column 16 and the tube 102 are described as box tubing, any other suitably shaped members such as rectangles, channels, round tubing and the like can be incorporated and shall not be construed as limiting to the scope of the invention. A plurality of mounting holes 110a–110n, preferably the outer of which are spaced at 16 inches on center, are located for convenient mounting of the base 18 to floor or ceiling members as required.

Figure 8:
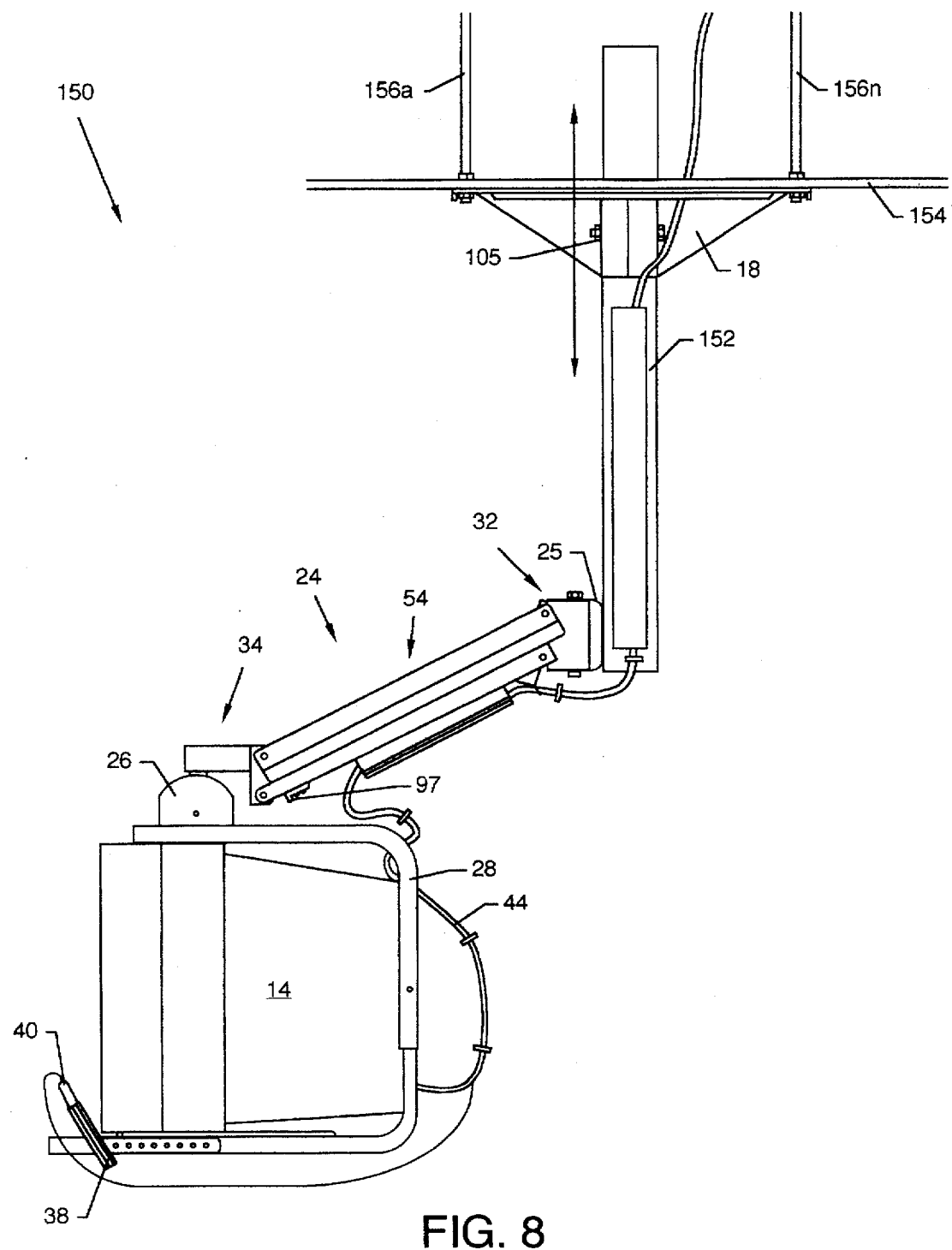
FIG. 8 illustrates a side view of a ceiling mounting of a vertical work station.

FIG. 8 illustrates ceiling mounting of a vertical work station 150 incorporating components similar to those previously described. For securement to the ceiling a shortened box tube column 152 is incorporated and extends through the base 18 to allow positioning of the monitor and positionable arm 24 at a suitable level. Optional ceiling mounting provides for an open work space below the monitor 14 and caddy 28 without infringement upon available floor space. The base 18 can be mounted directly to a planar ceiling surface 154 or can are secured to a plurality of overhead mounting studs 156a–156n extending downward from an upper support structure such as floor joists, beams and the like.

Figure 9:
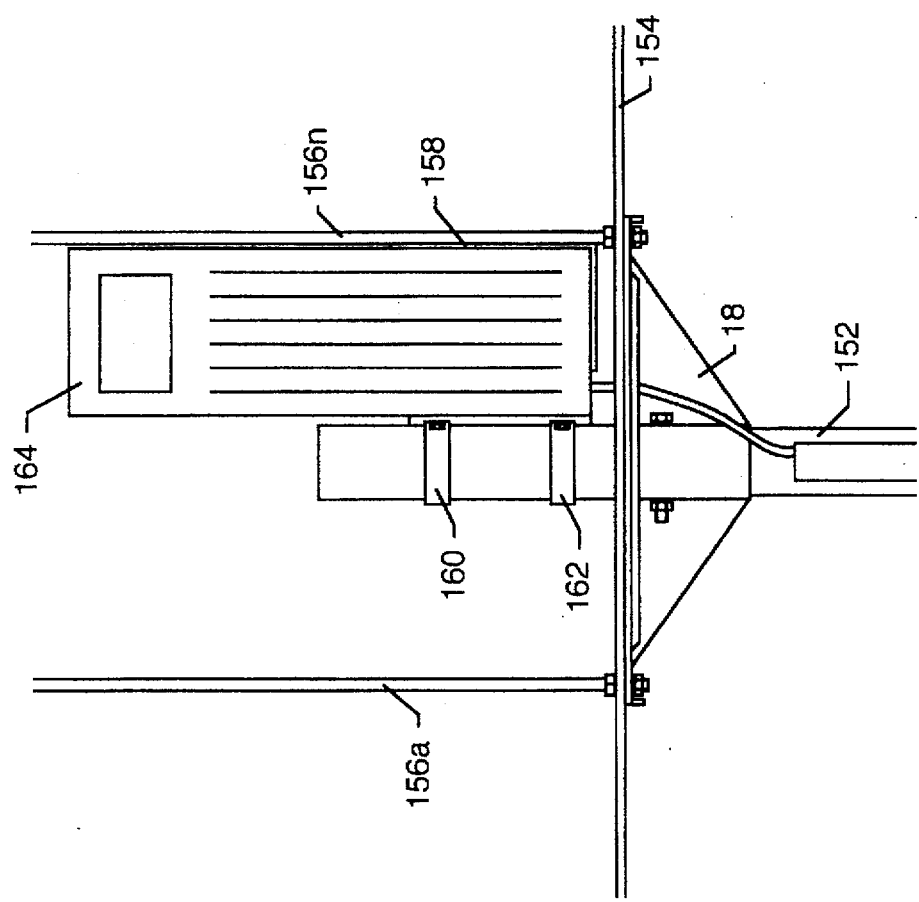
FIG. 9 illustrates a side view of a computer shelf secured to the upper region of the box tube column.

FIG. 9 illustrates a computer shelf 158 secured to the upper region of the box tube column 152 and above the ceiling surface 154 by brackets 160 and 162. A computer 164 is illustrated residing in the computer shelf 158.

Figure 10:
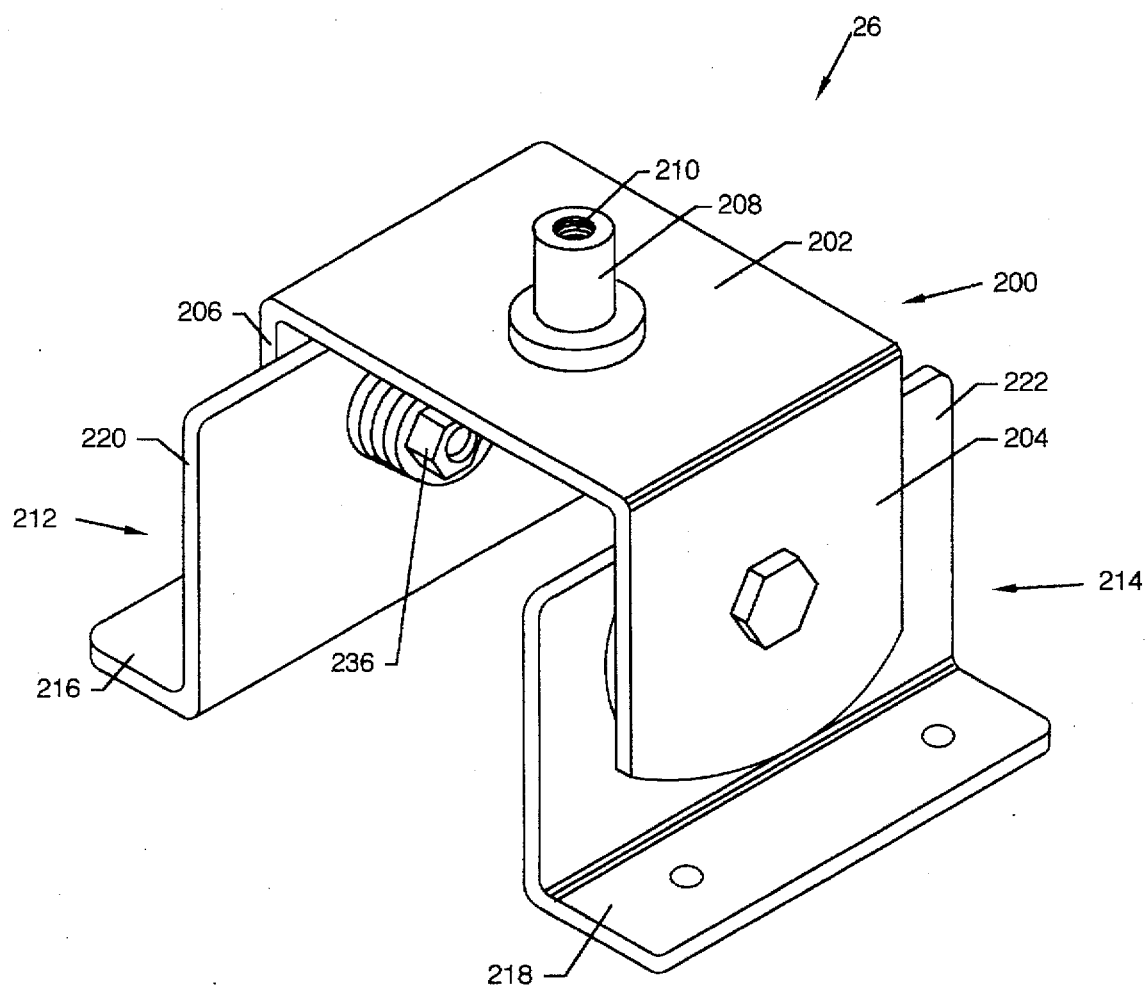
FIG. 10 illustrates an isometric view of a tilt/swivel mount.

FIG. 10 illustrates an isometric view of a tilt/swivel mount 26 which secures the caddy 28 of FIG. 1, or other caddies, to the positionable arm 24 where all numerals correspond to those elements previously described. The tilt/swivel mount 26 includes an inverted U-shaped channel member 200 having a top planar member 202, sides 204 and 206 extending at right angles from the top planar member 202, and a cylindrical attachment member 208 secured to the top member 202 having internal threads 210. A series of hardware including metal, plastic, or other composition material in the shape of washers, nuts and bolts rotatably secures the U-shaped channel member 200 to the L-brackets 212 and 214. The L-brackets 212 and 214 include horizontal members 216 and 218 at right angles to vertical side members 220 and 222, respectively, providing an attachment means to the caddy 28 of FIG. 1.

Figure 11:
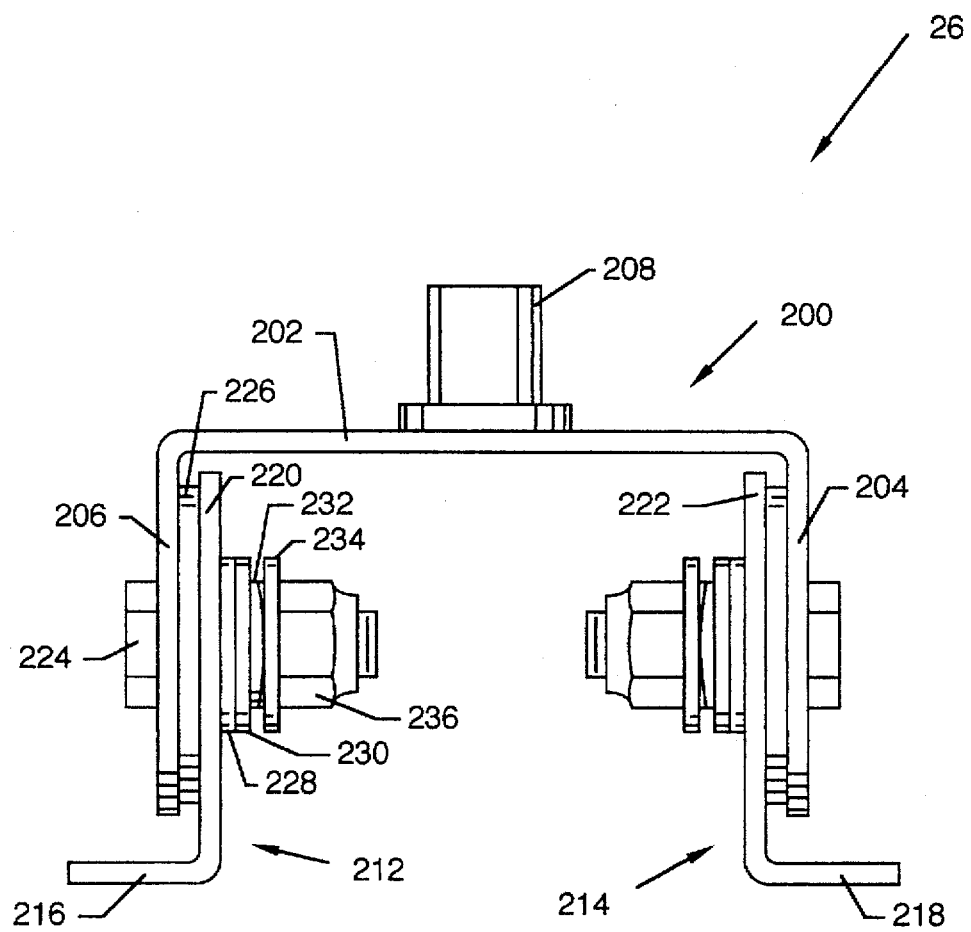
FIG. 11 illustrates a front view of the tilt/swivel mount of FIG. 10.

FIG. 11 illustrates a front view of the tilt/swivel mount 26 where all numerals correspond to those elements previously described. A bolt 224 extends through side 206 of the U-shaped channel member 200, through a plastic washer 226 of ultra high molecular weight polyethylene (UHMWP) material disposed between side 206 and vertical side member 220 of the bracket 212, through vertical side member 220 of the bracket 212, through a bronze washer 228, through a steel washer 230, through a precision spring washer 232, through a steel washer 234 and through a castellated lock nut 236. Any suitable plastic material can be utilized for plastic washer 226 having similar static and dynamic coefficients of friction. A mirror-like arrangement rotationally secures vertical side member 222 of L-bracket 214 to the side 204 of the U-shaped channel member 200 in the same manner as just described. Appropriate tension is applied between the head of the bolt 224 and the nut 236 to allow manual rotational positioning of the U-shaped channel member 200 with respect to the L-brackets 212 and 214. Through selection of the appropriate precision spring washers 232 and use of a custom feeler gauge to establish precision spacing between the steel washers 230 and 234, a specific rotational friction setting can be established to provide appropriate tilt control for a broad range of video monitors. Accordingly, the tilt/swivel mount 26 is a unique tilt resistive device that relies on the unique properties of a family of plastic materials having static and dynamic coefficients of friction which are substantially identical, such as Delrin or ultra high molecular weight polyethylene (UHMWP). The static and dynamic coefficients of friction of UHMWP materials, such as utilized in washers 226, and the unique result of this tilt restraining device (tilt/swivel mount 26) is that the caddy 28 and its payload remaining in any tilt position selected by the user. If the user wishes to tiltingly reposition the caddy 28 upwardly or downwardly, the caddy 28 must be manually 5 repositioned to overcome the tilt resistive device (tilt/swivel mount 26). Once the caddy 28 is tilted to a different selected position, the unique tilt resistive device (tilt/swivel mount 26) will resistably restrain the caddy 28 in the new position as selected. Sufficient friction to maintain position of the caddy 28 during use is provided but allows easy "breakaway" release to reposition the caddy 28 to a new operating position or to the storage position.

The unique characteristics of the polymer material 226 allows smooth tilt adjustment of the tilt and swivel, and yet provide a constant frictional memory for the preset position of the CRT. A horizontal poise is required of the operator to tilt the CRT, at which time it remains in the new position.

Various modifications can be made to the present invention without departing from the apparent scope hereof.

We claim:

1. A vertical work center comprising:
   a. a base;
   b. a column connected to said base;
   c. a bracket connected to said column;
   d. a positionable arm having an upper arm assembly end connected to said bracket and including gas springs connected between approximate ends of said positionable arm; and, e. a tilt/swivel means with at least one UHMWP washer connected to a lower arm assembly end for supporting a caddy.

2. The center of claim 1, including at least one gas cylinder in said arm.

3. The center of claim 1, including two gas cylinders in said arm.

4. The center of claim 1, including a keyboard below said caddy.

5. The center of claim 1, including a work shelf on said column.

6. The center of claim 1, including a support shelf for a CPU.

7. A vertical work center comprising:
a. a base;
b. a column connected to said base;
c. a bracket connected to said column;
d. a positionable arm having an upper arm assembly end connected to said bracket and including gas springs connected between approximate ends of said positionable arm; and,
e. a tilt/swivel means including opposing UHMWP washers connected to a lower arm assembly end for supporting a caddy.

8. The center of claim 7, including at least one gas cylinder in said arm.

9. The center of claim 7, including two gas cylinders in said arm.

10. The center of claim 7, including a keyboard below said caddy.

11. The center of claim 7, including a work shelf on said column.

12. The center of claim 7, including a support shelf for a CPU.

13. A vertical work station for supporting from above a caddy which holds a monitor, CRT, or other equipment comprising:
a. a base;
b. a vertical tube column;
c. a positionable arm comprising gas spring means used to provide energy storage means for easy positioning and repositioning of said caddy, an upper arm assembly, and a lower arm assembly;
d. a bracket that attaches said upper arm assembly to said column;
e. a tilt swivel means that attaches said lower arm assembly to said caddy; and,
f. washers contained in said tilt swivel means which include polymer washers with similar static and dynamic coefficient of friction.

14. A vertical work station for supporting from above a caddy which holds a monitor, CRT, or other equipment comprising:
a. a base;
b. a vertical tube column;
c. a positionable arm comprising gas spring means used to provide energy storage means for easy positioning and repositioning of said caddy, an upper arm assembly, and a lower arm assembly;
d. a bracket that attaches said upper arm assembly to said column;
e. a tilt swivel means that attaches said lower arm assembly to said caddy;
f. washers contained in said tilt swivel means which include polymer washers with similar static and dynamic coefficient of friction; and,
g. said polymer washers of said tilt swivel means are constructed of ultra high molecular weight polyethylene or Delrin.

15. The work station of claim 13 or 14, wherein the polymer washers are positioned between stainless steel washers and compressive force is locked into the polymer washers by a spring washer that is tightened down using a lock nut.

16. A vertical work station for supporting from above a caddy which holds a monitor, CRT, or other equipment comprising:
a. a base;
b. a vertical tube column;
c. a positionable arm comprising gas spring means used to provide energy storage means for easy positioning and repositioning of said caddy, an upper arm assembly, and a lower arm assembly;
d. a bracket that attaches said upper arm assembly to said column;
e. a tilt swivel means that attaches said lower arm assembly to said caddy; and,
f. an angled counterbalance means contained in said upper arm assembly, mounted on an inclined surface to provide an identical counterbalancing force over the entire range of positions of said adjustable arm.

17. A vertical work station for supporting from above a caddy which holds a monitor, CRT, or other equipment comprising:
a. a base;
b. a vertical tube column;
c. a positionable arm comprising gas spring means used to provide energy storage means for easy positioning and repositioning of said caddy, an upper arm assembly, and a lower arm assembly;
d. a bracket that attaches said upper arm assembly to said column;
e. a tilt swivel means that attaches said lower arm assembly to said caddy; and,
f. said upper arm assembly contains an adjustable slide member which provides for a wide range of adjustable counterbalance forces by rotating a fixed head.

18. The work station of claim 19, wherein said counterbalancing forces can balance a weight of 30–100 pounds.

19. A vertical work station for supporting from above a caddy which holds a monitor, CRT, or other equipment comprising:
a. a base;
b. a vertical tube column;
c. a positionable arm comprising gas spring means used to provide energy storage means for easy positioning and repositioning of said caddy, an upper arm assembly, and a lower arm assembly;
d. a bracket that attaches said upper arm assembly to said column;
e. a tilt swivel means that attaches said lower arm assembly to said caddy; and,
f. a stop bar that provides for a position stop for said adjustable arm and provides for a means to lock said adjustable arm in a fixed position.

20. The work station of claim 14, 17 or 19, wherein said base is mounted to the floor.

21. The work station of claim 14, 17 or 19, wherein said base is mounted to the ceiling.

22. The work station of claim 14, 17 or 19, wherein said tilt swivel means has inherent anti-rotational friction to allow stability during use.

23. The work station of claim 14, 17 or 19, wherein a fold-down work shelf is attached to said vertical tube column.

24. The work station of claim 14, 17 or 19, wherein a computer mounting platform is attached to said vertical tube column.

25. The work station of claim 14, 17 or 19, wherein said gas spring means comprises one or more gas springs.

26. The work station of claim 14, 17 or 19, wherein said gas spring means comprises two gas springs.

27. The work station of claim 14, 17 or 19, wherein polymer washers comprise one or more polymer washers.

28. The work station of claim 14, 17 or 19, wherein an optional keyboard tray and keyboard are secured to the bottom of said caddy.

29. The work station of claim 14, 17 or 19, wherein said upper arm assembly comprises a pivot which attaches to said bracket.

30. A vertical work station for supporting from above a caddy which holds a monitor, CRT, or other equipment comprising:

a. a base;

b. a vertical tube column;

c. a positionable arm comprising gas spring means used to provide energy storage means for easy positioning and repositioning of said caddy, an upper arm assembly, and a lower arm assembly;

d. a bracket that attaches said upper arm assembly to said column;

e. a tilt swivel means that attaches said lower arm assembly to said caddy; and, f. two polyethylene washers contained in said tilt swivel means to provide tilt control for said caddy.

* * * * *